(12) United States Patent
Schow

(10) Patent No.: US 6,751,226 B1
(45) Date of Patent: Jun. 15, 2004

(54) SYSTEM AND METHOD FOR PROVIDING MANAGED FRAME RELAY SERVICE

(75) Inventor: Peter H. Schow, Denver, CO (US)

(73) Assignee: Qwest Communications Int'l., Inc., Denver, CO (US)

( * ) Notice: Subject to any disclaimer, the term of this patent is extended or adjusted under 35 U.S.C. 154(b) by 0 days.

(21) Appl. No.: 09/200,166

(22) Filed: Nov. 25, 1998

(51) Int. Cl.$^7$ ............................................. H04L 12/28
(52) U.S. Cl. ...................... 370/409; 709/224
(58) Field of Search ................... 370/409, 241, 370/230, 242, 402, 244, 230.1, 250, 421, 252, 401; 709/223, 224, 232, 233, 234, 235; 340/825.07

(56) References Cited

U.S. PATENT DOCUMENTS

| | | | | |
|---|---|---|---|---|
| 5,343,465 A | * | 8/1994 | Khalil | 370/232 |
| 5,490,141 A | | 2/1996 | Lai et al. | 370/60.1 |
| 5,654,966 A | | 8/1997 | Lester, Jr. et al. | 370/392 |
| 5,889,470 A | * | 3/1999 | Kaycee et al. | 340/825.07 |
| 6,009,431 A | * | 12/1999 | Anger et al. | 707/10 |
| 6,115,362 A | * | 9/2000 | Bosa et al. | 370/248 |
| 6,148,337 A | * | 11/2000 | Estberg et al. | 709/224 |
| 6,343,064 B1 | * | 1/2002 | Jabbarnezhad | 370/216 |

OTHER PUBLICATIONS

Scan Technologies; Frame Relay; by Norm Al Dude and Professor N. Erd; Sep. 3, 1998, http://www.scan-technologies.com/tutorials/scan04.htm.

"SNMP—Simple Network Management Protocol"; http://www.rad.com/networks/1995/snmp/snmp.htm#snmp; Sep. 11, 1998.

Simple Network Management Protocol SNMP Version 1.0;http:www.cisco.com/univercd/cc/t. . . twk/ito_doc/55029.htm#xtocid237231; Sep. 8, 1998.

* cited by examiner

Primary Examiner—Chi Pham
Assistant Examiner—Alexander O. Boakye
(74) Attorney, Agent, or Firm—Marsh Fischmann & Breyfogle LLP

(57) ABSTRACT

A system is provided which monitors the frame and octet throughput of different aspects of a public frame relay network. Located in one domain is user provided equipment (CPE) which generates and receives frames over the public frame relay network. Also connected to the frame relay network are at least one destination site which also has the ability to receive and transmit frames. Included in the CPE is functionality to monitor the ingress and egress of frames and their contents. The public frame relay network also includes the functionality to monitor flow of information at its plurality of ingress and egress points. A network management server receives information from all these measurement points and through a variety of different processes, provides information as to the operating status of various portions of the managed frame network.

10 Claims, 2 Drawing Sheets

SYSTEM AND METHOD FOR PROVIDING MANAGED FRAME RELAY SERVICE

FIELD OF THE INVENTION

The invention relates to a apparatus and method for monitoring a frame relay network, and more particularly to monitoring the network from a plurality of different locations.

BACKGROUND OF THE INVENTION

Modern communications networks generally include a multiplicity of paths or links that are interconnected to route voice, video and data, traffic from one location of a network to another. At each location, an interconnect node or office couples a variety of sources and destinations to the network. In some cases, the sources and destinations are incorporated in a private line network that includes a series of offices connected together by leased-lines with switching facilities and transmission equipment owned and operated by the carrier and leased to the user. This type of network is conventionally referred to as a circuit-switching network. Accordingly, a source of one office at one location of the network may transmit to a destination of a second office located at another location in the network through their respective switching facilities.

Frame relay is a transmission scheme which may be employed in the type of circuit-switching network described above. Frame relay is a frame based transmission technique designed to create more efficient wide area networks (WANs) by permitting users to access only the amount of bandwidth they need for a given application. Frame relay is a "connection-oriented" protocol. It establishes a logical connection for the duration of the call and may be implemented as a permanent virtual circuit (PVC) service.

As described above, a frame relay network-provides logical connectivity between geographically distributed devices, using special circuits, which can be multiplexed, over a single access path. A frame relay network may consist of two distinct parts. The first part includes customer sites which have customer premise equipment (e.g., routers, bridges, frame relay access devices) that are connected to a frame relay service. The configuration and management of such devices are the responsibility of the customer. The second portion belongs to the frame relay service provider, which has a network of switches, commonly housed in central offices, and are connected using internodal trunks supplied by the service provider. This network of switches and trunks is typically managed and provisioned by the service provider at their own network's operation center.

A number of different factors may affect the performance of the frame relay network. In order for a service provider to get an accurate picture of the operation of the network, data must be collected and analyzed from both the first and second portions of the system.

SUMMARY OF THE INVENTION

Currently, frame relay service providers offer network services to customers for transmitting information between two geographically separated sites. The frame relay service providers establish a connection between equipment located at the customer's site and the frame relay network. The inventor has recognized that it may be desirable to monitor the operation of the frame relay network from a plurality of different locations which may include the ingress and egress points of the customer's equipment as well as at different points within the network itself.

In the system described herein, a connection is established between the customer provided equipment (CPE), which may include routers, bridges, frame relay access devices and the frame relay network. Incorporated into the provided equipment at the customer site are devices and systems for instrumenting inflow and outflow of transmitted information from specified points. In one aspect of the invention, simple network management protocol (SNMP) management information bases (MIBs) are used as part of a management system. Incorporated into customer provided equipment are software modules which employ the SNMP to monitor the ingress and egress of data from the particular site.

In a frame relay system, individual frames are transmitted and received over the frame relay network. The frames are made up of a variety of different elements. Of particular interest are the octets which include identifying information for the frame as well as the data which the system user is trying to transmit. A particular frame may carry as little as two octets or as many as is necessary in order to transmit the, information. The SNMP protocol in conjunction with the MIB may be configured to count the total number of frames received and transmitted as well as the total number of octets. In order to give a system user a better idea of where frames are being dropped in the system, SNMP may be employed to monitor the transmission and receipt of frames at different points in the frame relay network including the customer provided equipment, as well as points within the network itself.

In one aspect of the invention, the customer provided equipment may be connected to the frame relay network over an electrical connection, such as a T1 transmission line. On the customer side, the line may be connected to a customer data terminal equipment (DTE) device such as a router, a bridge or a frame relay access device. Located between the DTE and the transmission line may be an interface device which monitors and controls the magnitude of the signals between the customer provided electronics and the network itself. On the network side, the connection may be made to a public switch.

In one aspect of the invention the customer may wish to monitor the transmission and receipt of frames and octets over the transmission line between the customer equipment and the network. Information is gathered from the frame relay network and the CPE at to the quantities of data transmitted and received. To gather this information, the service provider employs a network, management server, which is programmed to request, process, and analyze information received from the locations being monitored. Among the types of analysis which may be performed, is a comparison may be made between the data (frames and/or octets) originating from the CPE, with the data received at the access port to the frame relay network. An analysis may also be performed of data traveling in the opposite direction.

In yet another aspect of the invention, monitoring processes may be performed for the virtual circuits in the frame relay network. In a frame relay network, a number of virtual circuits may be established between a particular origination point and a number of different destinations. According to the invention described herein, the SNMP may be used to collect data relating to the ingress and egress at origination and destination points within the frame relay network. In order words, monitoring may be performed at the public access switch which establishes the connection with the CPE. Another monitoring point may then be established at the point where the data exits the data network and is delivered to the destination CPE. Further analysis may also be performed from various nodes within the frame relay network to monitoring locations at the CPE's.

In yet another aspect of the invention, the information gathered during monitoring may be processed such that it is compared against a constant which was generated in light of known operating parameters of the network, or tolerances of a particular customer for dropping frames. This comparison provides an indication of the performance of portions of the system against a known standard.

Numerous modifications and additions will be apparent to those skilled in the art upon further consideration of the invention.

DETAILED DESCRIPTION

A frame relay network provides logical connectivity between geographically distributed devices using virtual circuits which may be multiplexed over a single path. A frame relay network usually consists of two distinct parts. The first part consists of customer sites which have data terminal equipment DTE (e.g., routers, bridges, frame relay access devices) that are connected to the frame relay service. The configuration and management of these devices are usually the responsibility of the customer. The second portion is the frame relay network itself. Included is a network of switches, which are connected using internodal trunks supplied by the service provider. This network of switches and trunks is typically managed and provisioned by the service provider at their own network operation center. Under direction from the customer, the network provider establishes a virtual circuit from the customer location to a desired destination.

Figure 1:
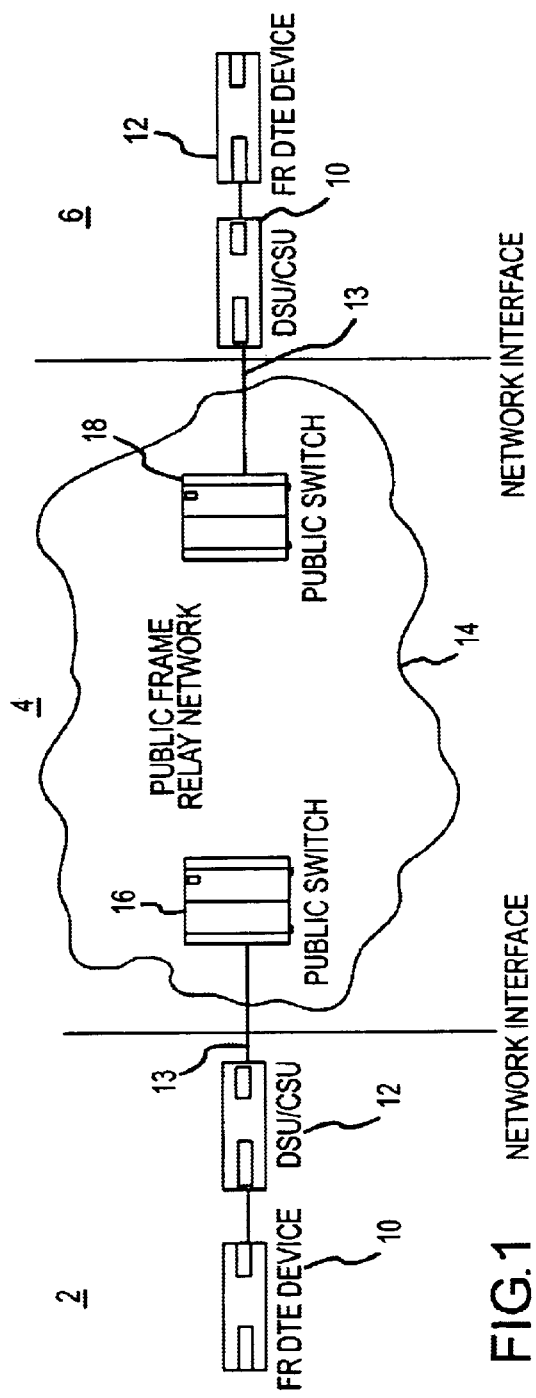
FIG. 1 discloses a system diagram for a public frame relay network.

Disclosed in FIG. 1 is a simplified system diagram of a frame relay network 4 in connection with customer provided equipment (CPE)2. As can be seen, the network is made up of two separate domains. The first domain being the customer management domain to which interfaces with the service provider domain. Also in connection with the frame relay domain is destination 6, which is also controlled by the customer. The customer domains 2 and 6 are described in terms of origin and destination for clarity, however one skilled in the aft would know that both of these customer domains includes the ability to both receive and transmit data over the frame relay network. The customer domains include provisioning and management of computer service unit/data service unit (CSU/DSU) equipment 12, where the CSU/DSU 12 provides the signal processing for transmitting and receiving data over the frame relay network. The customer domain DTE may be embodied as a router, bridge, or any type of frame relay access device. Each customer site has an access link 13 to the frame relay service that connects to a carrier switch access port.

The public frame relay network 4 is comprised of a plurality of virtual circuits which connect the customer origination site with a particular destination. A plurality of nodes within the network provide for the establishment of these virtual circuits. Multiplexing functionality incorporated into the network allows a particular data line to be used in multiple virtual circuits. Access to the frame relay network is provided over lines 13 to public switches 16 and 18.

The invention described herein is a threshholding invention that periodically evaluates a system of expressions to detect escalating network performance problems before they cause outages on the network. Certain systems exist today for providing the mechanism for monitoring particular aspects of network performance. One data collection mechanism is simple network management protocol (SNMP), which is an application layer protocol designed to facilitate the exchange of management information between network devices. Use of SNMP to access management information data increases the capability to manage network performance and find and solve network problems. In one embodiment of the invention, SNMP agents are software modules incorporated into the managed devices. These modules monitor designated operations within the managed device and make performance data available to a network management system. With this performance data, a number of different aspects of the CPEs and network function may be monitored. These aspects include the number and state of the virtual circuits, number of certain kinds of error messages received, number of octets and frames which are being transmitted and received by a particular device, broadcast messages which are sent and received, as well as network interfaces going down and coming up. For purposes of the invention described herein, SNMP is used to monitor the transmission and receipt of frames and octets at difference points in the CPE and the managed network.

Figure 2:
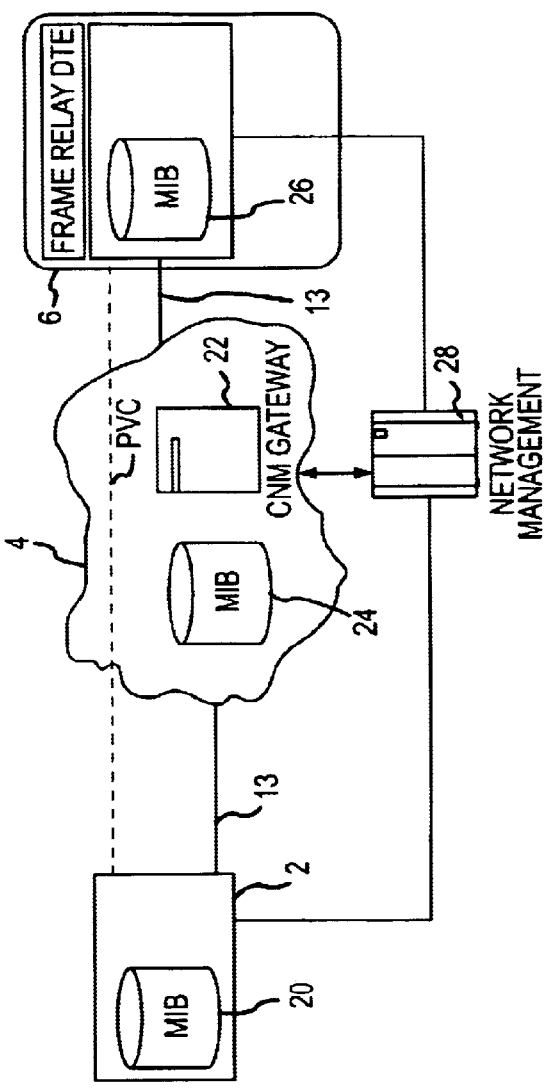
FIG. 2 discloses a public frame relay network with the simple network management protocol incorporated (SNMP) therein.

Disclosed in FIG. 2 is a system diagram which shows the monitoring apparatus for the managed customer domains as well as the public frame relay network 4. All monitoring is done through a network management server 28. This management server has a direct connection via a CNM agent 22 to the frame relay network. CNM is a service provided by public frame relay network operators that permits customers to obtain information about their frame relay circuit subscriptions. This information is usually made available through the use of the industry standard RFC 1604 MIB. Connections are also established via a CPE management access to the managed customer domains. It is also possible that the CPE connection is established via the frame relay network. As can be seen, incorporated into the monitoring apparatus for both the customer domain and the frame relay network are management information bases (MIBs) 20 and 26. These MIBs are databases of Objects. These objects are created by the SNMP software modules and are indicative of a particular performance aspect of the device being monitored.

For purposes of the invention described herein, the values that are stored in the MIBs are either the total number of frames transmitted and received over a particular period of time, or the number of octets transmitted and received over a particular period of time. Frame relay networks operate such that only a particular amount of information can be transmitted over the virtual circuits in a predetermined period of time. When the available bandwidth is exceeded, the network automatically begins dropping frames before they reach their ultimate destination. This is the frame relay network's management tool for handling congestion. The frames which are lost are then later transmitted by the customer equipment until the entire set of information is received at the destination.

In the invention described herein, polling intervals are established for each of the measurement points in the system. Between these two successive polling intervals, frames or octets are counted which either are transmitted and/or received by the particular device from which the measurement is made and these values are stored in the MIB. At such time as the network management server polls the MIBs, the information for a particular interval is retrieved. The system described herein provides the capability for measuring the performance of the frame relay network including the CPEs between identified points. In the embodiments of the invention described herein, a first point is located in the customer DTEs, and a second point is located at the public switch access point 16 for CPE 2. Another point is public switch 18 which provides the access to customer CPE 6. A finally point of measurement is located in the customer CPE 6 itself. One skilled in the art would realize that these measurements points can be incorporated into any of the nodes within the public frame relay network or any of the customer CPEs.

Figure 3:
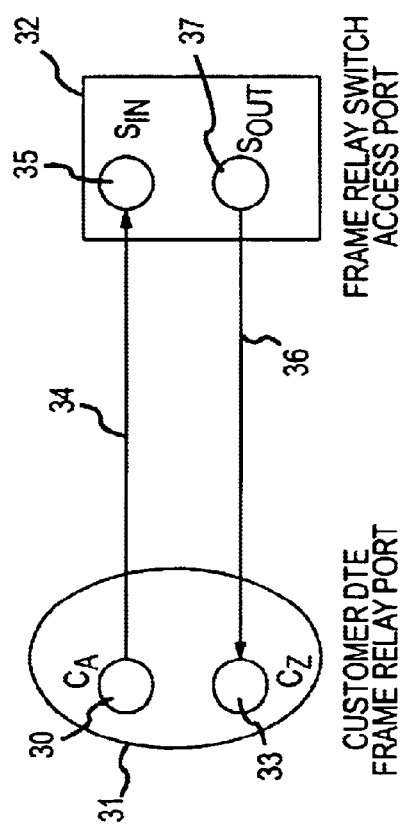
FIG. 3 discloses a system diagram disclosing in detail the connection between the customer provided equipment interface and the interface switch for the public frame relay network.

As is seen, each customer site connects to the public frame relay system by using an access link connect, between a port on a service provider access switch and the CPE. A frame relay access link can be considered as two unidirectional data flows, with one direction originating at the CPE and terminating at the service provider access port. The other direction starting at the service provider access port and terminating at the CPE. FIG. 3 discloses a system diagram which shows the bidirectional flow between the customer DTE frame relay port 30 and the frame relay switch access port 32 which provides access to the public frame relay network. In the invention described herein, the access link 34 is a T1 line. The data collected either end of the access lines is used to determine whether losses are occurred in this part of the system.

The MIBs in the CPEs and the network, record the total number of frames or octets transmitted or received from a particular site over a particular time period. When the MIB is accessed by the network management server, the recorded information is provided.

The following is a description of the analysis performed at the network management server for the retrieved data. The calculations performed by the network management server are compared against a constant which is developed for the particular customer requesting the service as well as the particular connection which is being monitored.

In the first analysis described herein, the MIB in the CPE provides data relating to a number of frames and octets transmitted from point 31 over access line 34 to point 35. Data has also been gathered as to the number of frames and octets transmitted from point 37 and then the number of frames and octets which were received at point 33. In order to determine the performance of the access line the following analysis is performed first for octets and then for frames.

For the $C_A \rightarrow S_{in}$ octet throughput, which is a comparison of the octet count originating from the customer DTE and the octet count received at the ingress access switch point are measured, the expression:

$$100 * ((|\Delta ifOutOctets(C_A) - \Delta ifInOctets(S_{IN})|)/\Delta ifOutOctets(C_A)) \leq \epsilon$$

where:
ifOutOctets is the number of octets transmitted from a particular frame relay port;

ifInOctets is the number of octets received at a particular frame relay port;

yields the percentage of the originating octet that was received by the destination ingress switch port during a given time sample. The percentage is compared against the constant developed for this analysis.

For the $S_{out} \rightarrow C_z$ octet throughput, which is a comparison of the octet count originating from egress switch access point versus the octet count received at the customer DTE the expression:

$$100 * ((|\Delta ifOutOctets(S_{OUT}) - \Delta ifInOctets(C_z)|)/\Delta ifOutOctets(S_{OUT})) \leq \epsilon$$

yields percentage of the originating octet count that was received by the destination customer DTE during a given time sample. The percentage is compared against the constant developed for this analysis.

In the $C_a \rightarrow S_{in}$ frame throughput, which is a comparison of frame count originating from the customer DTE versus frame count received at the egress access switch point, the expression:

$$100 * ((|\Delta ifOutUcastpkts(C_A) - \Delta ifInUcastPkts(S_{IN})|)/\Delta ifOutUcastpktS(C_A)) \leq \epsilon$$

where:
ifOutUcastpkts is the number of frames transmitted from a particular frame relay port;

ifInUcastPkts is the number of frames received at a particular frame relay port;

yields a percentage of the originating frame count that was received by the destination ingress switch port during a given time sample. The percentage generated is compared against a constant developed for this analysis.

For the $S_{out} \rightarrow C_z$ frame throughput, which is a comparison of frame count originating from egress switch access port versus frame count received at customer DTE, the expression:

$$100 * ((|\Delta ifOutUcastpkts(S_{OUT}) - \Delta ifInUcastPkts(C_z)|)/\Delta ifOutUcastpkts(S_{OUT})) \leq \epsilon$$

yields the percentage of the originating frame count that was received by the destination customer DTE, during a given time sample. This percentage is then compared against a constant developed for this analysis.

Figure 4:
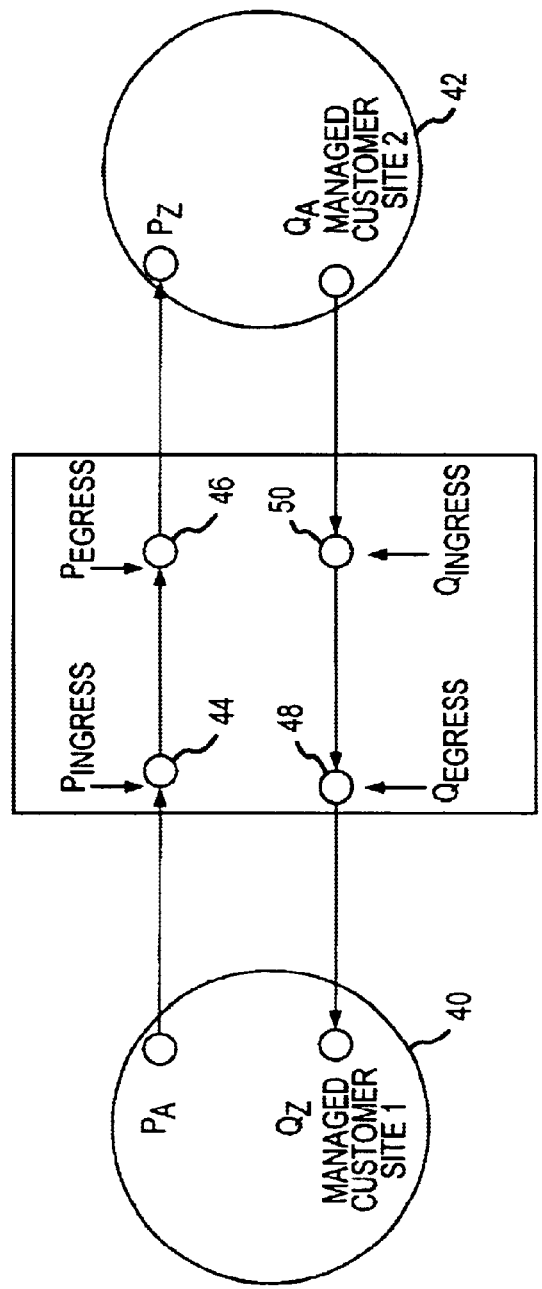
FIG. 4 discloses a system diagram which discloses the monitoring points for the virtual circuits within the public frame relay network.

The permanent virtual circuits (PVCs) in a frame relay network are logical circuits that define a specific path between a customer DTE source device and a DTE destination device. A frame relay PVC can be considered as two unidirectional data flows. The end to end reference diagram for a frame relay PVC is disclosed in FIG. 4. Measurement points for a PVC are located at the two ends of each PVC. One flow measurement is made for the $P_a \rightarrow P_z$ direction from the origination site to the destination site, while the other flow consists of the $Q_a \rightarrow Q_z$ direction from destination site to the origination site.

As with the analysis of the access line, the analysis of the permanent virtual circuit throughput can be performed for both the frame throughput and the octet throughput. In the case where the P ingress octet throughput is being measured, which is a comparison of octet count originating from customer PVC at site 1 and the PVC octet count received at ingress access switch port, the expression:

$$\frac{100*((|\Delta frCircuitSentOctets(P_A) - \Delta frPVCEndptInOctets(P_{INGRESS})|)}{\Delta frCircuitSentOctets(P_A)} \le \epsilon$$

where:

frCircuitSentOctets is the number of octets transmitted from a particular frame relay PVC origination point;

frPVCEndptInOctets is the number of octets received at a particular frame relayPVC origination point;

yields the percentage of the originating PVC octet count that was transmitted out the PVC egress port, during a given time sample. The percentage is compared against a constant developed for this analysis.

For the $P_{ingress} \rightarrow P_{egress}$ octet throughput, which is the comparison of PVC octet count received by the ingress access switch and the PVC octet count sent by the egress switch, the expression:

$$\frac{100*((|\Delta frPVCEndptInOctets(P_{INGRESS}) - frPVCEndptOutOctets(P_{EGRESS})|)}{\Delta frPVCEndptInOctets(P_{INGRESS})} \le \epsilon$$

where:

frPVCEndptOutOctets is the number of octets received at a particular frame relay port on the other side of the frame relay network. yields the percentage of the originating PVC octet count that was received by the access switch ingress port, during a given time sample. This percentage is then compared against a constant developed for this analysis.

For the $P_{egress} \rightarrow P_z$ octet throughput, which is a comparison of the PVC octet count exiting the egress switch port and the PVC octet count received at the destination customer DTE at site 2, the expression:

$$\frac{100*((|frPVCEndptOutOctets(P_{EGRESS}) - \Delta frCircuitReceivedOctets(P_Z)|)}{frPVCEndptOutOctets(P_{EGRESS})} \le \epsilon$$

where:

frCircuitReceivedOctets($P_z$) is the number of octets received at a particular frame relay port.

yields the percentage of the originating PVC octet count that was received by the access switch ingress port, during a given time sample. Percentage is then compared against a constant developed for this analysis.

For the $Q_a \rightarrow Q_{octet}$ throughput, which is a comparison can then be made of the octet count originating from the customer PVC at site 2 and the PVC octet count received at ingress access switch port, the expression:

$$\frac{100*((|\Delta frCircuitSentOctets(Q_A) - \Delta frPVCEndptInOctets(Q_{INGRESS})|)}{\Delta frCircuitSentOctets(Q_A)} \le \epsilon$$

yields the percentage of the originating PVC octet count that was received by the access switch ingress port, during a given sample. This percentage is compared against a constant developed for this analysis.

For the $Q_{ingress} \rightarrow Q_{egress}$ octet throughput, which comparison of the PVC octet count received by the ingress access switch and the PVC octet count sent by the egress switch, the expression:

$$\frac{100*((|\Delta frPVCEndptInOctets(Q_{INGRESS}) - frPVCEndptOutOctets(Q_{EGRESS})|)}{\Delta frPVCEndptInOctets(Q_{INGRESS})} \le \epsilon$$

yields the percentage of the originating PVC octet that was received by the access switch ingress port, during a given time sample. The percentage compared against a constant developed for this analysis.

For the $Q_{egress} \rightarrow Q_z$ octet throughput, which is the PVC octet count exiting the egress switch port and the PVC octet count received at the destination customer DTE at site 1, the expression:

$$\frac{100*((|frPVCEndptOutOctets(Q_{EGRESS}) - \Delta frCircuitReceivedOctets(Q_Z)|)}{frPVCEndptOutOctets(Q_{EGRESS})} \le \epsilon$$

yields percentage of the originating PVC octet count that was received by the access switch ingress port, during a given time sample. This percentage may be compared against the constant developed for this analysis.

This analysis is designated for the $P_a \rightarrow P_{ingress}$ frame throughput, which is the frame count originating from customer PVC at site 1 and the PVC frame count received ingress access switch port the expression:

$$\frac{100*((|\Delta frCircuitSentFrames(P_A) - \Delta frPVCEndptInFrames(P_{INGRESS})|)}{\Delta frCircuitSentFrames(P_A)} \le \epsilon$$

where:

frCircuitSentFrames is the number of frames transmitted from a particular frame relay port;

frPVCEndptInFrames is the number of frames received at a particular frame relay port;

yields the percentage of the originating PVC frame count that was transmitted out the PVC egress port, during a given time sample. This percentage may be compared against a constant developed for the analysis.

For the $P_{ingress} \rightarrow P_{egress}$ frame throughput, which is the PVC frame count received by the ingress access switch and the PVC frame count sent by the egress switch the expression:

$$\frac{100*((|\Delta frPVCEndptInFrames(P_{INGRESS}) - frPVCEndptOutFrames(P_{EGREES})|)}{\Delta frPVCEndptInFrames(P_{INGRESS})} \le \epsilon$$

where:

frPVCEndptOutFrames($P_{EGRESS}$) is the number of frames received at a relay port on the other side of the frame relay network.

yields the percentage of the originating PVC frame count that was received by the access switch ingress port, during a given time sample. This percentage is further compared against the constant developed for this analysis.

This analysis is for the $P_{egress} \rightarrow P_z$ frame throughput, which is the PVC frame count exiting the egress switch port and the PVC frame count received at the destination customer DTE at site 2, the expression:

$$100 * ((|frPVCEndptOutFrames(P_{EGRESS}) - \Delta frCircuitReceivedFrames(P_Z)|) / frPVCEndptOutFrames(P_{EGRESS})) \leq \epsilon$$

where:
  frCircuitReceivedFrames($P_z$) is the number of frames received at a particular frame relay port.
yields the percentage of the originating PVC frame count that was received by, the access switch ingress port, during a given time sample. The percentage is compared against the constant developed for this analysis.

This analysis is for the $Q_a \rightarrow Q_{ingress}$ frame throughput, which is the frame count originating from customer PVC at site 2 and the PVC frame count received at ingress access switchport, the expression:

$$100 * ((|\Delta frCircuitSentFrames(Q_A) - \Delta frPVCEndptInFrames(Q_{INGREES})|) / \Delta frCircuitSentFrames(Q_A)) \leq \epsilon$$

yields the percentage of the originating PVC frame count that was received by the access switch ingress port, during a given time sample. The percentage is compared against a constant developed for this analysis.

For the $Q_{ingress} \rightarrow Q_{egress}$ frame throughput, which is the PVC frame count received by the ingress access switch and the PVC frame count sent by the egress switch, the expression:

$$100 * ((|\Delta frPVCEndptInFrames(Q_{INGRESS}) - frPVCEndptOutFrames(Q_{EGREES})|) / \Delta frPVCEndptInFrames(Q_{INGRESS})) \leq \epsilon$$

yields the percentage of the originating PVC frame count that was received by the access switch ingress port, during a given time sample. This percentage may be compared against a constant developed for this analysis.

Finally, for the $Q_{egress} \rightarrow Q_x$ frame throughput, which is the PVC frame count exiting the egress switch port and the PVC frame count received at the destination customer DTE at site 1, the expression:

$$100 * ((|frPVCEndptOutFrames(Q_{EGRESS}) - \Delta frCircuitReceivedFrames(Q_Z)|) / frPVCEndptOutFrames(Q_{EGRESS})) \leq \epsilon$$

yields a percentage of the originating PVC frame count that was received by the customer DTE at site 1, during a given time sample. The percentage is compared against a constant developed for this analysis.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method for monitoring a communications system which includes a frame relay network:
   monitoring data traffic passing between at least one piece of customer provided equipment (CPE) and at least one frame relay network interface, wherein the at least one frame relay network interface is in connection with the frame relay;
   monitoring frame relay data traffic between the at least one frame relay network interface and at least one other frame relay interface located across a frame relay network from the at least one frame relay interface; and
   comparing the data traffic and the frame relay data traffic to determine performance for portions of the communications network.

2. The method of claim 1 wherein the compared data traffic and frame relay data traffic is further compared against a constant to determine the current operational status of the network relative to a predetermined value.

3. The method of claim 1 wherein the monitored data traffic and frame relay traffic is at least one of: number of frames counted over a predetermined period of time, or a number of octets counted over a predetermined period of time.

4. A monitoring system for a communications system which includes a frame relay network, comprising:
   at least one customer provided electronic (CPE) monitoring module configured to be connectable to at least one piece of CPE, wherein the CPE monitoring module is further configured to monitor data traffic to and from the at least one piece of CPE with the frame relay network;
   a frame relay network monitor which monitors the data traffic passing through a plurality of frame relay network interfaces; and
   a network performance processor which compares the data traffic between the at least one CPE and at least one frame relay network interface and the data traffic over the frame relay network to determine performance for portions of the communications network.

5. The method of claim 1 wherein the monitoring is further performed between the at least one CPE and the at least one other frame relay network interface.

6. The method of claim 1 wherein analysis is performed for a plurality of the virtual circuits.

7. The system of claim 4 wherein the at least one CPE monitoring module and the frame relay network module monitor at least one of:
   number of frames counted over a predetermined period of time, or a number of octets counted over a predetermined period of time.

8. The system of claim 4 wherein simple network monitoring protocol (SNMP) is used by both the at least one CPE monitoring module and the frame relay network monitoring.

9. The system of claim 8 wherein management information bases (MIB) are used to store information generated by the at least one CPE monitoring module and the network monitor modules.

10. The system of claim 4 wherein the at least one CPE monitoring module is incorporated into at least one of: a router, bridge, and frame relay access device, at a customer site.

* * * * *